May 27, 1947. G. B. ZIMMERMAN 2,421,229
PROCESS FOR THE SEPARATION OF ISOBUTENE FROM A MIXTURE OF $C_4$ HYDROCARBONS
Filed Sept. 11, 1942
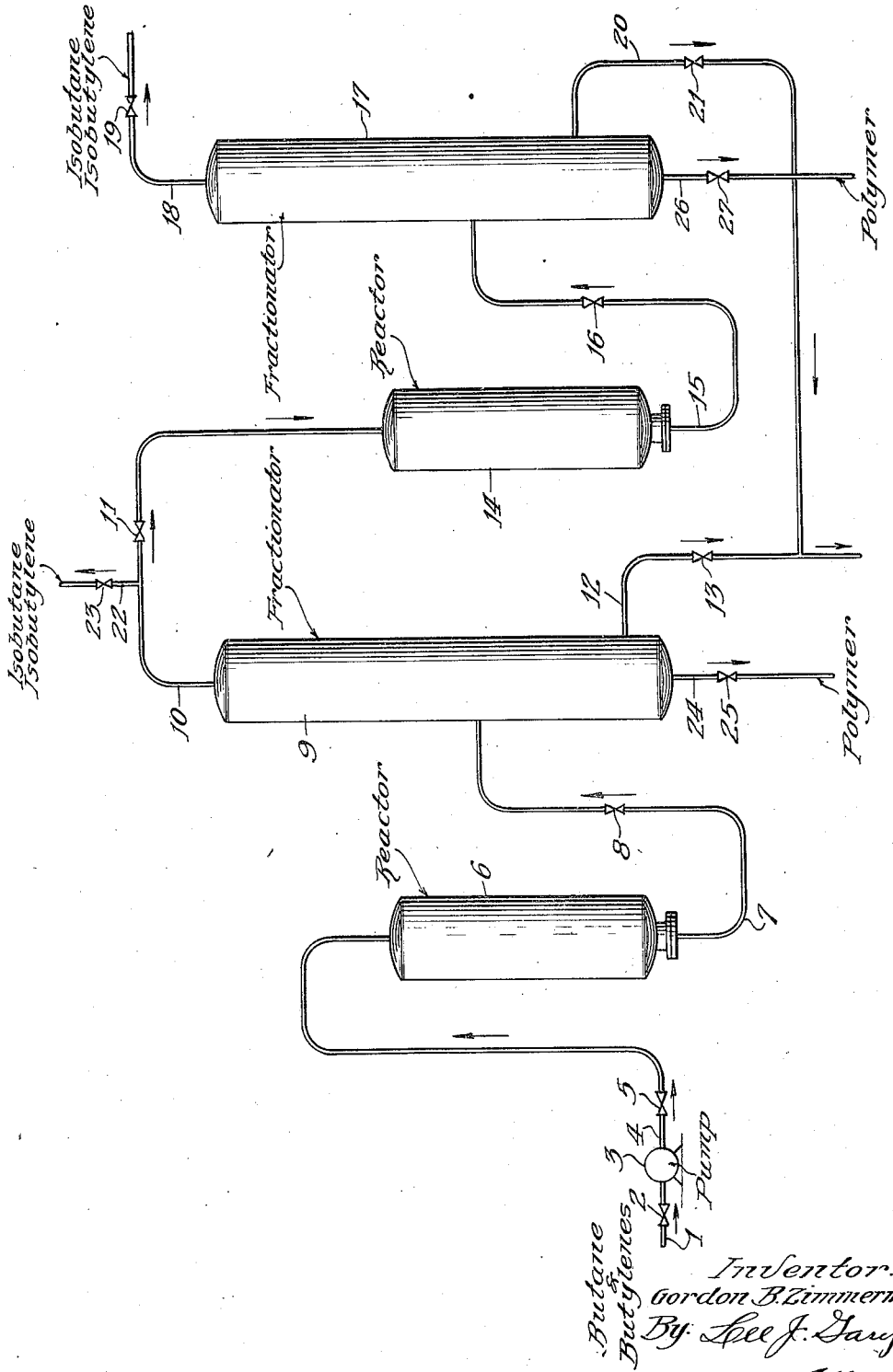
Inventor:
Gordon B. Zimmerman
By Lee J. Gary
Attorney Patented May 27, 1947

2,421,229

UNITED STATES PATENT OFFICE 2,421,229

PROCESS FOR THE SEPARATION OF ISO-BUTENE FROM A MIXTURE OF $C_4$ HYDRO-CARBONS

Gordon B. Zimmerman, Chicago, Ill., assignor to Universal Oil Products Company, Chicago, Ill., a corporation of Delaware Application September 11, 1942, Serial No. 457,943

7 Claims. (Cl. 260—677)

This invention relates to the separation of olefinic hydrocarbons from paraffinic hydrocarbons and is more particularly concerned with the separation of isobutylene from mixtures of saturated and unsaturated $C_4$ hydrocarbons.

The production of synthetic rubber has assumed considerable importance at the present time. Two of the most important methods of producing synthetic rubbers are the polymerization of isobutene and butadiene and the polymerization of styrene and butadiene. The physical properties of the synthetic rubbers produced by the above polymerization processes are dependent to a large extent upon the purity of the reacting hydrocarbons which controls the length of the chain of the hydrocarbons in the synthetic rubber polymer.

The present invention discloses a method for separating the isobutene from the various other $C_4$ hydrocarbons and in conjunction with the separation process produces hydrocarbons suitable for further dehydrogenation to butadiene.

It is well known that simple fractional distillation of a mixture of $C_4$ paraffins and olefins does not result in a practical separation since the boiling points of the various hydrocarbons are somewhat similar. This is particularly true with a mixture of $C_4$ olefins and paraffins containing the isomers, as will be evident by studying the table presented below.

Boiling points at 1 atmosphere pressure

| | °F. |
|---|---|
| Isobutane | 10.8 |
| Isobutene | 20.2 |
| Normal butene-1 | 20.4 |
| Normal butane | 31.1 |
| Normal butene-2 trans | 33.7 |
| Normal butene-2 cis | 38.6 |

It is evident from the above boiling points that a separation of the individual hydrocarbons by simple fractional distillation is practically impossible. It is also evident that it is comparatively easy to separate the $C_4$ hydrocarbons into two fractions, the overhead containing isobutane, isobutene and normal butene-1 and the bottoms containing normal butane, normal butene-2 trans and normal butene-2 cis. However, the separation of isobutene and normal butene-1 is practically impossible by fractional distillation since the difference in the normal boiling point is approximately 0.2 of a degree F.

The present invention provides a simple efficient method of removing the normal butene-1 hydrocarbon from the isobutane-isobutene fraction which may subsequently be separated into isobutane and isobutene. This method consists of isomerizing the normal butene-1 to normal butene-2 either the trans or cis form and removing this hydrocarbon by fractional distillation.

This isomerization may be effected by contacting the $C_4$ mixture following the separation of the normal butanes and butene-2 with a number of catalysts under specific conditions of temperature, pressure and contact time. The primary feature of the present invention is the conduction of the isomerization reaction under processing conditions such that the isomerization of butene-1 to butene-2 cis and trans forms occurs at such a rapid rate that the isomerization may be accomplished without any substantial effect on the isobutene in the $C_4$ fraction charge. The particular set of conditions chosen will be dependent upon the type of catalyst being utilized since the catalyst will regulate the reaction rates of the various isomerization reactions.

The butane-butene fractions which can be effectively treated in the process of this invention may be the exit gases from a catalytic cracking operation, catalytic dehydrogenation operation, thermal cracking operation or similar hydrocarbon conversion processes which produce butane-butene fractions containing the various $C_4$ hydrocarbons.

This invention is particularly useful in conjunction with processes for the production of butadiene either by the single stage catalytic dehydrogenation of normal butane or by the two-stage catalytic dehydrogenation of normal butane to butenes which are subsequently dehydrogenated to butadiene. The isobutene hydrocarbon which is formed during the reaction has been found to undergo decomposition to carbon and hydrogen and increase the carbon deposition on the catalyst to a marked extent. The elimination of the isobutene from the recycle to catalytic zone tends to decrease the regenerating requirement of the operation.

In one specific embodiment, the present invention comprises a process for the separation of isobutene from a mixture of $C_4$ hydrocarbons containing substantial amounts of isobutene and normal butene-1 which comprises contacting the isobutene and normal butene-1 mixture with an olefin isomerizing catalyst under processing conditions regulated to selectively isomerize the normal butene-1 to normal butene-2 and subsequently separating the isobutene from the reaction products.

The process of this invention will be more fully explained in the description of the accompanying diagrammatic drawing which illustrates in conventional side elevation one type of apparatus in which the objects of the invention may be accomplished.

For simplification, such equipment as condensers, coolers, furnaces, control valves and the like which are not essential to the explanation, have been omitted from the drawing.

Referring to the drawing a butane-butene mixture containing isobutene, isobutane and butene-1 obtained by the preliminary separation of the $C_4$ hydrocarbons from any suitable source such as catalytic cracking, catalytic dehydrogenation or thermal cracking, is introduced through line 1 containing valve 2 into pump 3 which discharges through line 4 containing valve 5 into reactor 6 wherein the heated hydrocarbons are contacted with a suitable isomerizing catalyst under conditions such that the butene-1 in the $C_4$ fraction is selectively isomerized to butene-2. The isobutene and isobutane in the $C_4$ fraction are substantially unaffected under the particular operating conditions chosen.

The catalyst within reactor 6 may comprise a synthetic composite of silica-alumina, silica-alumina-zirconia, activated clays, aluminum sulfate, kieselguhr impregnated with phosphoric acid, bauxite, aluminum phosphate, pumice and lime. Various other catalysts such as liquid phosphoric acid, benzene sulfonic acid, perchloric acid and aqueous zinc chloride may also be used. The solid catalysts recited above may be utilized in the granular form disposed within reactor 6 to form a fixed bed through which the $C_4$ hydrocarbons will pass or they may be utilized in powdered form. Utilization of a powdered catalyst is particularly effective if operated under conditions such that a fluidized catalyst mass is obtained, the fluidizing medium being the heated $C_4$ vapors.

The temperature in isomerization zone 6 will be dependent primarily upon the type of catalyst used. When phosphoric acid or other acid catalysts which may also act as polymerization catalysts are used, the temperature will ordinarily be within the approximate range of 50 to 500° F.

Under certain conditions some of the catalysts will tend to promote the polymerization of the olefins along with the isomerization reaction. However, the isomerization reaction is a comparatively easy reaction and proceeds at a very rapid rate under the influence of a catalyst. Therefore, by the proper selection of the processing conditions, the polymerization will be held at a minimum while obtaining the desired isomerization.

When alumina-silica or alumina-silica-zirconia composites and activated clays or aluminum phosphate are used, the temperature will be within the approximate range of 400 to 1000° F. The operation may be conducted in the liquid, mixed or vapor phase depending upon the particular conditions chosen. The contact time measured as liquid hourly space velocity (volumes of $C_4$ charge per volume of catalyst space per hour) will vary within the range of 3 to 50 depending upon the type of catalyst used and the temperature at which the operation is being conducted. The temperature-space velocity relationship with respect to any individual catalyst will be such that the actual acceleration of the isomerization of butene-1 to butene-2 is so much greater than the reaction rate of isobutene to butene-2 that the desired isomerization reaction can be accomplished without any substantial conversion of the isobutene.

From isomerization zone 6 the reaction products containing isobutane, isobutene, butene-2, unconverted butene-1 and the small amount of polymer formed during the reaction are directed through line 7 containing valve 8 into fractionator 9 wherein the isobutene, isobutane and unconverted butene-1 are separated from the butene-2 and polymer. The isobutene, isobutane and unconverted butene-1 are withdrawn through line 10 containing valve 11 and if no substantial amount of butene-1 remains therein, are withdrawn through line 22 containing valve 23 and sent to a separation step wherein the isobutene is separated from the isobutane by any of the well known means known to those skilled in the art, such as solvent extraction, azeotropic distillation, solvent distillation, etc. The butene-2 is withdrawn through line 12 containing valve 13 and may be recovered as a product of the reaction or further processed, for example, to produce butadiene. The polymer is withdrawn through line 24 containing valve 25.

If the $C_4$ fraction withdrawn through line 10 contains a substantial amount of unconverted butene-1 the stream of hydrocarbons is directed into reactor 14 which is similar to reactor 6 and further isomerization of the butene-1 accomplished. The reaction products from reactor 14 are withdrawn through line 15 containing valve 16 and directed into fractionator 17 wherein the isobutene-isobutane is separated from the butene-2 and polymer. The butene-2 is withdrawn through line 20 containing valve 21 and combined with the butene-2 in line 12. The isobutane-isobutene withdrawn through line 18 containing valve 19 may be treated in a manner similar to that pointed out previously to separate a substantially pure isobutene. The polymer is withdrawn through line 26 containing valve 27 and is recovered as a product of the reaction.

The isomerization of the butene-1 to butene-2 is an equilibrium reaction and as the hydrocarbons reach equilibrium under the particular conditions chosen in the isomerizing zone, only the equilibrium conversions can be obtained. However, by removing the butene-2 hydrocarbons formed, the equilibrium is disturbed and further isomerization can be conducted in subsequent processing zones. By successive isomerization with intermediate separation of the butene-2 an isobutane-isobutene fraction substantially free of butene-1 is obtained. Although only two isomerization zones are shown in the drawing presented herein, it should be understood that the present invention is not limited in this respect, but is broad to any number of isomerization zones necessary to accomplish the desired object of the invention.

I claim as my invention:

1. A process for the separation of isobutene from a mixture of $C_4$ hydrocarbons containing isobutene and butene-1 which comprises contacting said mixture with an olefin isomerizing catalyst under isomerizing conditions regulated to selectively isomerize the butene-1 to butene-2 without effecting to any substantial extent isomerization of the isobutene contained therein, and subsequently fractionating the isobutene from the resulting isobutene-butene-2 mixture.

2. A process for the separation of isobutene from a mixture of C4 hydrocarbons containing isobutene and butene-1 which comprises contacting said mixture with a phosphoric acid catalyst under isomerizing conditions regulated to selectively isomerize the butene-1 to butene-2 without effecting to any substantial extent isomerization of the isobutene contained therein, and subsequently fractionating the isobutene from the reaction mixture.

3. A process for the separation of isobutene from a mixture of C4 hydrocarbons containing isobutene and butene-1 which comprises contacting said mixture with a silica-alumina catalyst under isomerizing conditions regulated to selectively isomerize the butene-1 to butene-2 without effecting to any substantial extent isomerization of the isobutene contained therein, and subsequently fractionating the isobutene from the reaction mixture.

4. A process for the separation of isobutene from a mixture of C4 hydrocarbons containing isobutene and butene-1 which comprises selectively isomerizing the butene-1 to butene-2 without effecting to any appreciable extent isomerization of the isobutene by contacting said mixture with a phosphoric acid catalyst at a temperature of from about 50 to about 500° F., at a liquid hourly space velocity of from about 3 to about 50 and subsequently fractionating the isobutene from the reaction mixture.

5. A process for the separation of isobutene from a mixture of C4 hydrocarbons containing isobutene and butene-1 which comprises selectively isomerizing the butene-1 to butene-2 without effecting to any appreciable extent isomerization of the isobutene by contacting the hydrocarbon mixture with a silica-alumina catalyst at a temperature of from about 400 to about 1000° F., at a liquid hourly space velocity of from about 3 to about 50 and subsequently fractionating the isobutene from the reaction mixture.

6. A process for the separation of isobutene from a mixture of C4 hydrocarbons containing isobutene and butene-1 which comprises contacting said mixture with an olefin isomerizing catalyst under isomerizing conditions whereby the butene-1 is selectively isomerized to butene-2 without effecting to any substantial extent isomerization of the isobutene, fractionating the reaction products to separate the butene-2 from the isobutene and unconverted butene-1 and introducing the isobutene and unconverted butene-1 to a second isomerization zone to convert substantially all of the butene-1 to butene-2, and subsequently fractionating the reaction products to separate isobutene substantially free from butene-1.

7. A process for the separation of isobutene from a mixture of C4 hydrocarbons containing isobutene and butene-1 which comprises contacting said mixture with an aluminum sulfate catalyst under isomerizing conditions regulated to selectively isomerize the butene-1 to butene-2 without effecting to any substantial extent isomerization of the isobutene, and subsequently fractionating the isobutene from the reaction mixture.

GORDON B. ZIMMERMAN.

REFERENCES CITED

The following references are of record in the file of this patent:

UNITED STATES PATENTS

| Number | Name | Date |
| --- | --- | --- |
| 2,281,804 | Ruthruff | May 5, 1942 |
| 2,199,133 | Marschner | Apr. 30, 1940 |
| 2,298,931 | Drennan | Oct. 13, 1942 |
| 2,388,510 | Voge | Nov. 6, 1945 |
| 2,330,115 | Drennan | Sept. 21, 1943 |